3,664,792
CONCRETE PLANK MOLDING MACHINE
Roland C. Draughon, 2922 S. Adams 98401; Paul D. Jensen, 1011 68th Ave E. 98424; and Donald F. Jensen, 1005 Fife Heights Drive NE. 98422, all of Tacoma, Wash.
Filed May 7, 1969, Ser. No. 822,506
Int. Cl. B28b 7/02
U.S. Cl. 425—186   9 Claims

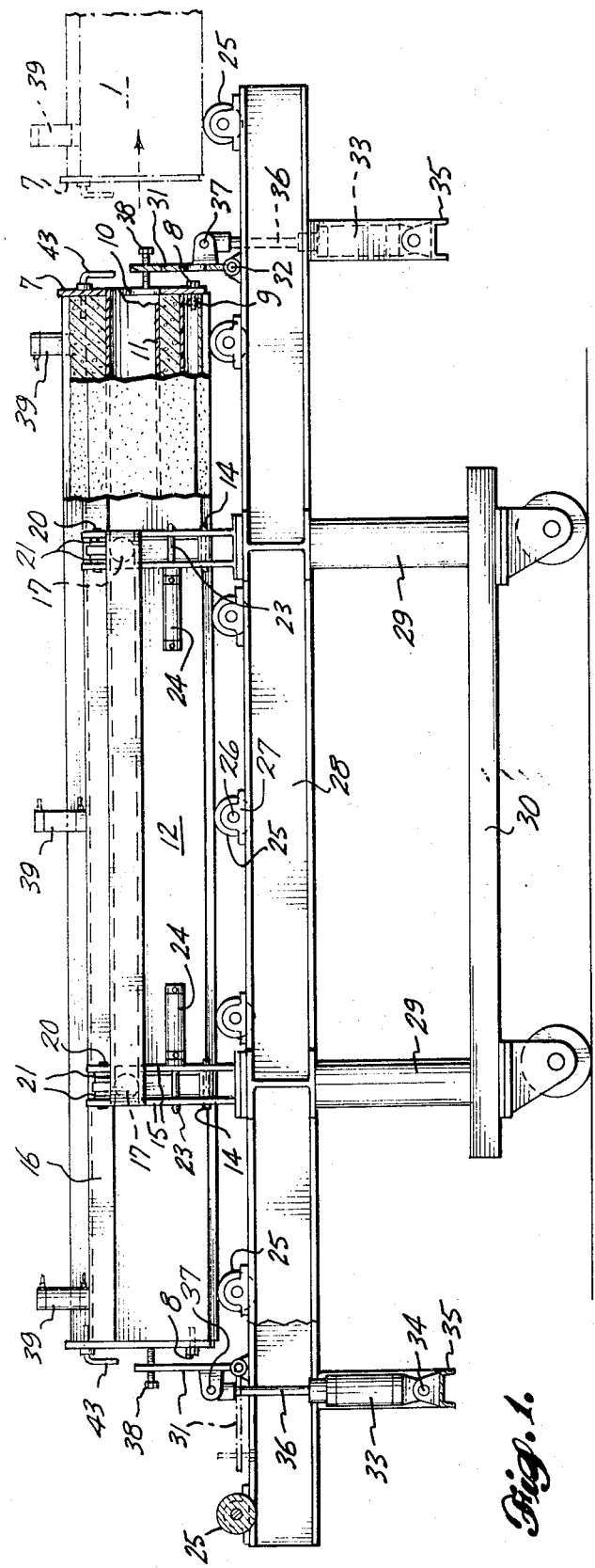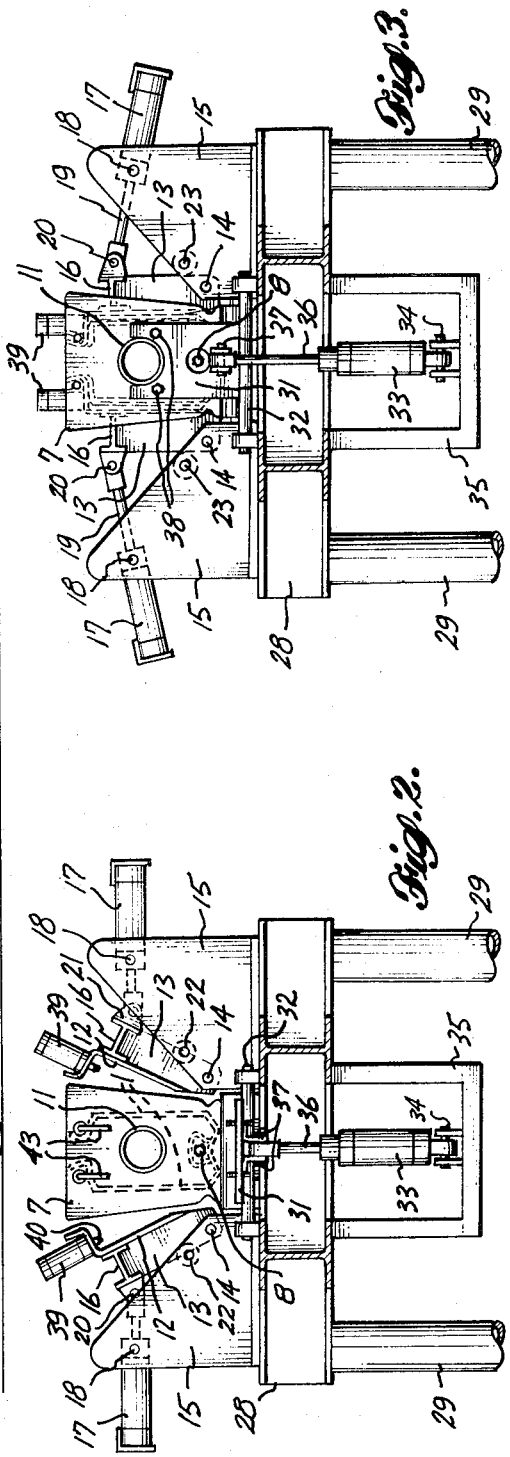

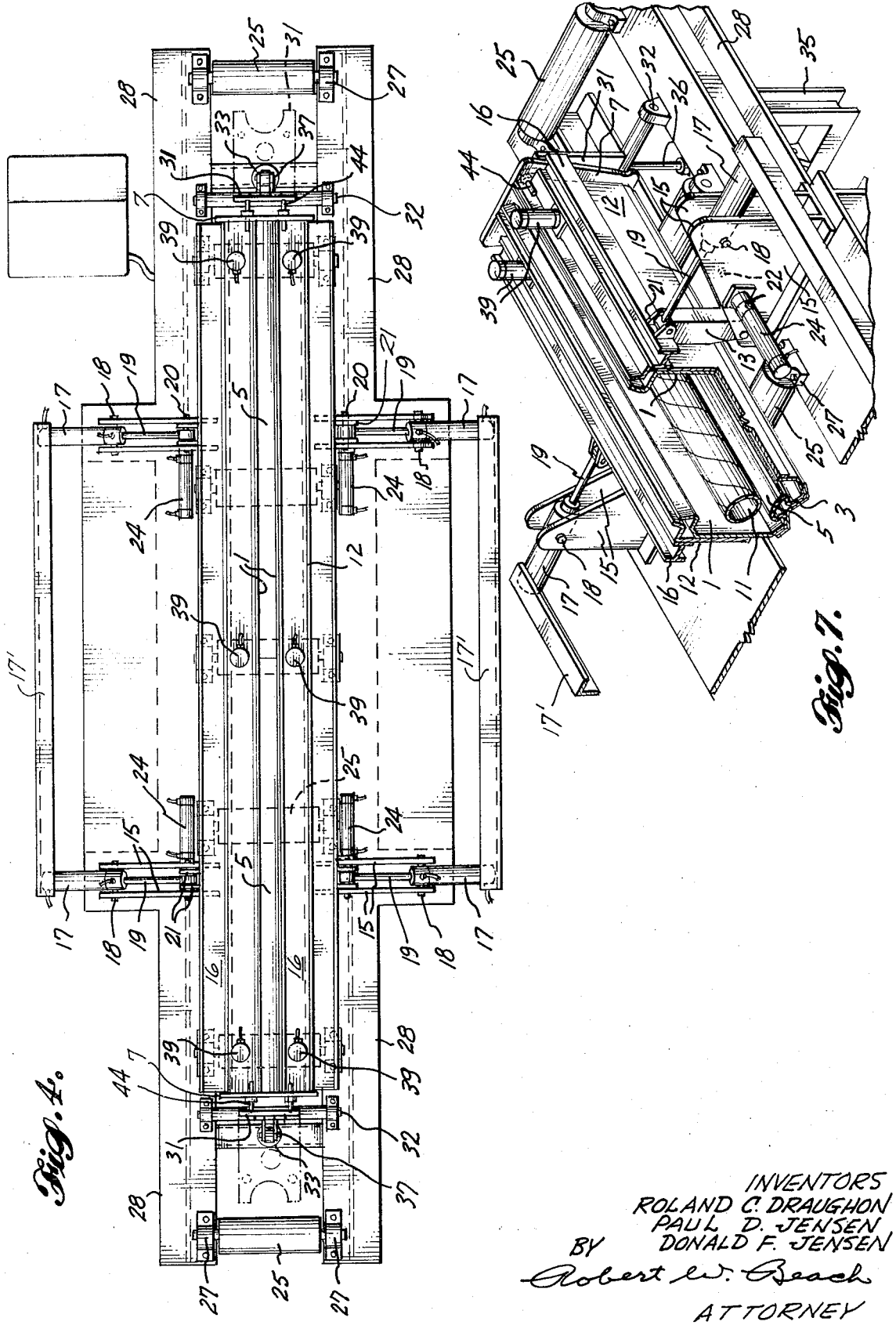

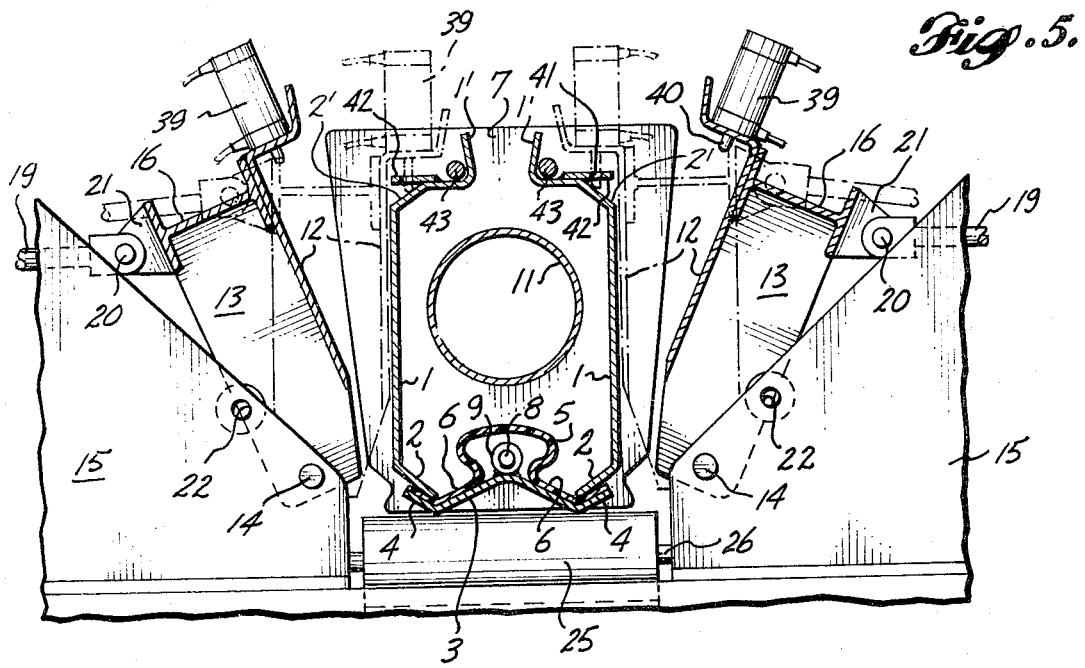
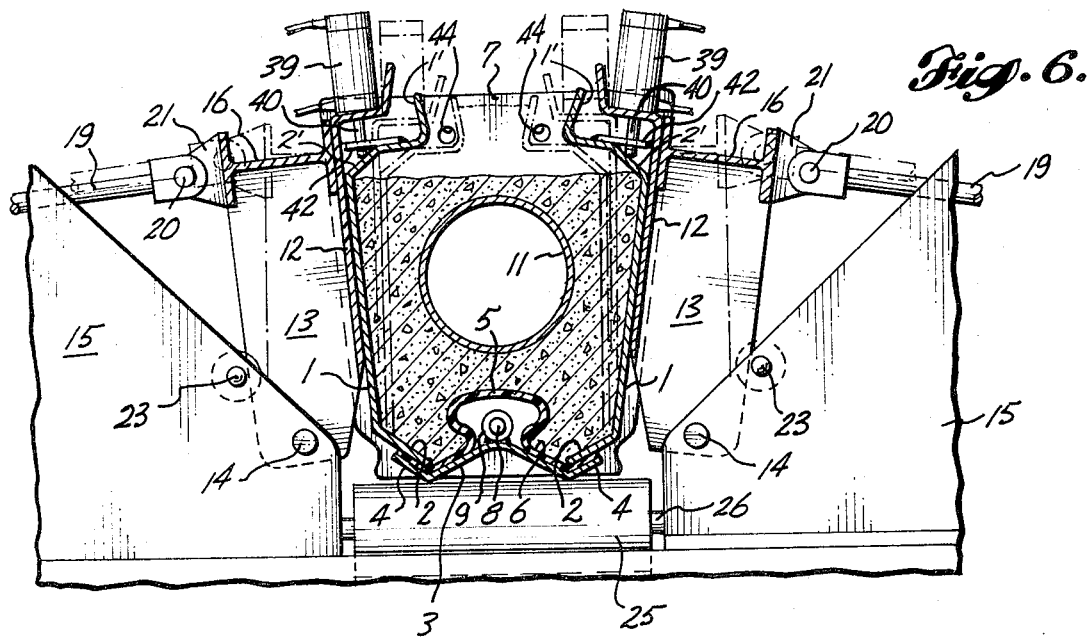

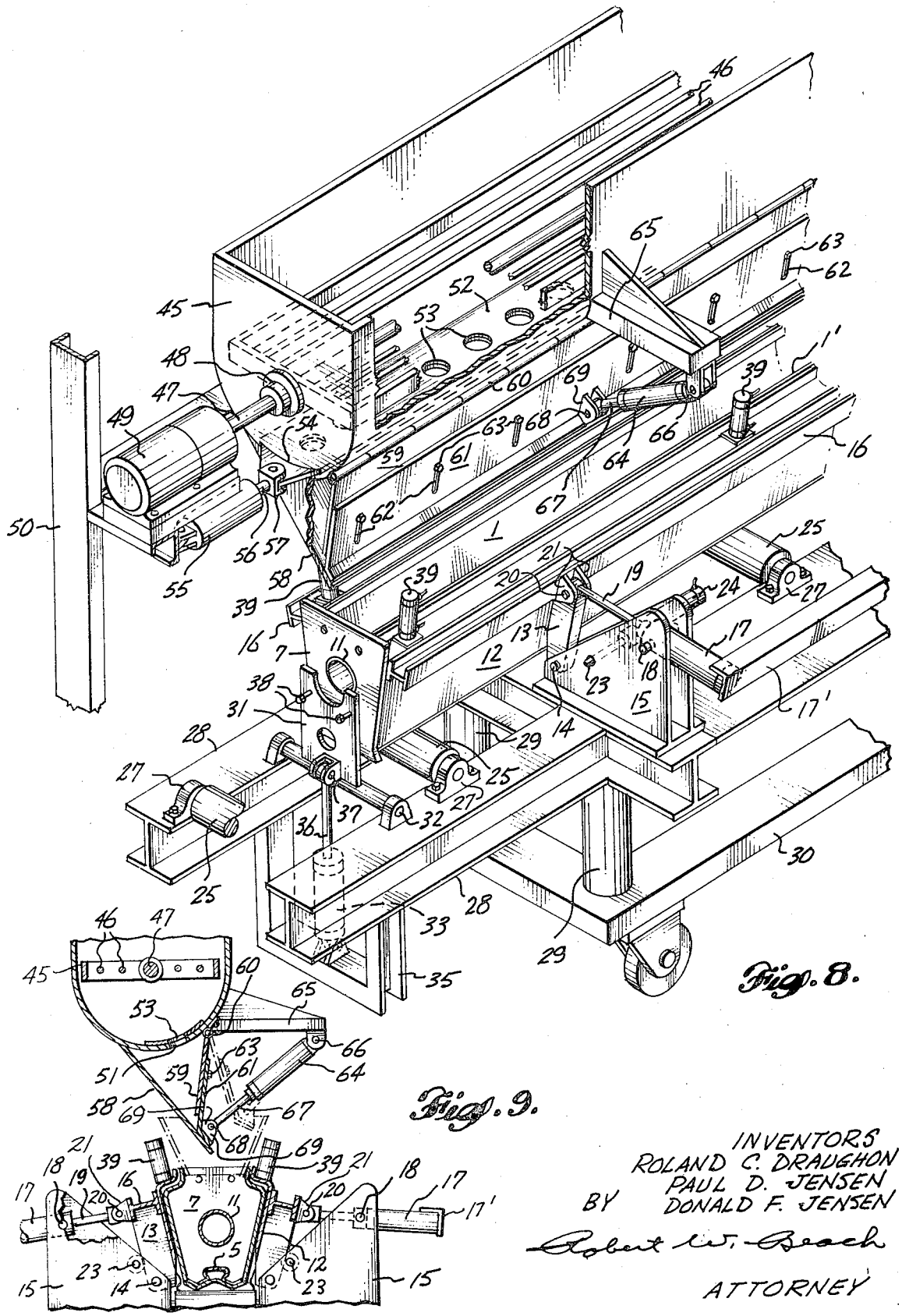

ABSTRACT OF THE DISCLOSURE

A concrete plank mold including a bottom with a flexible groove-forming strip and sides tiltable relative to the bottom can be moved into and out of a molding machine on rollers. Plates swingable by fluid-pressure jacks at opposite sides of the mold are securable by latch jacks to the mold sides. Tapered mold end plates are held against the ends of the mold sides to confine the material in the mold during swinging of the mold sides to settle the concrete mix. A concrete mix supply hopper overlying the mold has an adjustable-volume metering chamber for dispensing measured charges of concrete mix into the mold.

---

The concrete product molding machine of the present invention incorporates a number of improvements over the concrete molding machine of U.S. Pat. 2,582,161. While the present machine could be used for molding various types of elongated concrete articles, it is particularly advantageous for molding concrete planks having tongue and groove edges so that such planks can be assembled in interfitting relationship to form a wall. Preferably the interfitting tongues and grooves are of dovetail cross section so that the adjacent planks will be locked together.

A principal object of the present invention is to provide a molding machine which can be used effectively in a production-line type of operation so that a mold can be moved quickly into the molding machine, charged with concrete mix, the concrete mix can be worked in the mold so that the mold is filled completely and the mold can then be locked up and removed from the molding machine for curing of the concrete.

A related object is to provide mechanism for integrating the mold quickly with the molding machine for cooperation between the mold and molding machine during the molding operation and thereafter for disengaging the mold quickly from the molding machine so that the mold can be removed from the machine and replaced by another mold for the next molding operation.

Another object is to provide a simplified mold structure which will be rugged in use, the parts of which can be assembled readily and which can be stripped quickly from a molded product after the concrete mix has set.

It is also an object to provide mechanism for supplying conveniently to the mold an accurately measured charge of concrete mix.

FIG. 1 is a side elevation of the concrete molding machine with a mold in place in it, parts being broken away. FIG. 2 is an end elevation of such molding machine and mold showing parts in one relationship and FIG. 3 is an end elevation of the molding machine and mold showing parts in a different relationship.

FIG. 4 is a plan of the molding machine and mold.

FIG. 5 is an enlarged vertical transverse section through the mold and adjacent portions of the molding machine showing parts in one relationship and FIG. 6 is a similar view showing parts in a different relationship.

FIG. 7 is a top perspective of an end portion of a mold and adjacent parts of the molding machine, portions being broken away.

FIG. 8 is a top perspective of an end portion of the mold, molding machine and concrete mix supplying mechanism with parts broken away.

FIG. 9 is a transverse section through the mold, molding machine and concrete mix supplying mechanism having parts broken away.

While the molding apparatus of the present invention is illustrated in connection with only one type of mold form, it will be appreciated that molds of different shape can be used with the molding machine. Such machine is, however, particularly well adapted to be used for producing tongue and groove planks in a mold of the type shown in the drawings and described below. The representative plank mold includes elongated side plates 1 having downwardly and inwardly inclined lower flange portions 2 and inclined mold top portions 2' which are adapted to mold V-joint plank edges. Upper edge flanges 1' flare upwardly from the adjacent portions of the side plate tops to provide a form for a dove tail tongue. Such side plates extend upward from an elongated bottom plate 3 which preferably has an arched central portion and flanges 4 flaring upwardly generally complementary to the inclination of the lower side plate flanges 2. The arched central portion of the bottom plate and its side flanges cooperate to form a plate having a cross section of shallow W-shape providing spaced grooves in which the lower side plate flanges 2 can be set.

Within the mold bottom is a flexible sheet liner covering bottom plate 3 and having edge portions engaged between the lower flanges 2 of the side plates and the edge flanges 4 of the bottom plate to provide a seal between such flanges in overlapping relationship. The side portions 6 of the liner can be bonded to the mold bottom plate 3. The central portion 5 of such liner is molded or otherwise shaped as a hollow bulge having undercut side portions to form, in its relaxed condition, a groove of generally dovetail shape in a molded plank edge. Such liner bulge 5 is sufficiently flexible so that it may be deformed to be stripped out of the narrow opening of the molded groove.

The opposite ends of the mold are closed by end plates 7 which may be tapered in profile toward the mold bottom plate 3. The lower portion of each end plate is secured to the adjacent end portion of the mold bottom plate by a bolt 8 extending through the end plate and screwed into a nut 9 secured to the bottom plate. As seen in FIGS. 1, 5 and 6, such bolt extends into the hollow within the bulge 5 of the bottom liner so that these bolts do not interfere with production of the molded product. The upper portions of the end plates are wide enough so that they will close the ends of the mold even when the side plates are tilted outward through a substantial angle from their parallel relationship as shown in FIG. 6. Also, each end plate has in it a central aperture 10 for the purpose of receiving an end portion of a core tube 11 extending lengthwise of the mold. Such core tube may be disposable, being made of cardboard, or may be contractable for removal from a molded product.

The molding machine has side presser and backing plates 12 confining opposite sides of the mold, respectively, as shown best in FIGS. 5 and 6. These plates are supported by presser blocks 13 shown in FIGS. 5, 6 and 7, the lower ends of which blocks are mounted on pivots 14 extending between parallel upright mounting plates 15. The backing plates 12 are capable of exerting pressure uniformly along their lengths on mold side plates 1 which they engage because they are backed by strongback bars 16 extending along their upper portions and connected to the presser blocks 13.

Pressure is exerted on the backing plates at the locations of the strongback bars by fluid-pressure jacks 17 shown in FIGS. 2, 3, 8 and 9. These jacks are tiltably mounted by pivots 18 carried by the mounting plates 15 and their bases are connected by bars 17' to coordinate swinging of the jacks. The jack plungers 19 are connected by pivots 20 to yokes 21 mounted on the strongback bar 16 as shown in FIGS. 5, 6 and 7. The axes of pivots 18 are located so that the jack plungers will be disposed substantially perpendicular to backing plates 12 when the jacks are exerting the greatest pressure on such plates.

In order to allow the opposed backing plates 12 to be spread apart sufficiently to enable a mold to be moved between them, the presser mechanism including a plate 12, presser blocks 13 and strongback bar 16 should be capable of being swung outward about the pivot 14 into the position shown in FIG. 5. With the presser mechanism parts in this position, the lower portions of the presser blocks will be spaced apart a distance greater than the width of the mold end plate 7 between them as shown in FIG. 5. When a mold has thus been positioned between the presser plates 12 jacks 17 can be extended to swing the pressure mechanism from the positions shown in FIG. 5 in full lines into the positions shown in FIG. 6 in full lines.

During the molding operation the backing plates 12 should not be permitted to separate more than shown in full lines in FIG. 6. To limit movement of the backing plates to this range holes 22 are provided in the presser-mounting plates 15, as shown in FIG. 5, through which stop rods 23 can be projected so as to be engaged by presser blocks 13 as limit stops. Such rods can be projected through the apertures 22 by fluid-pressure jacks 24 shown in FIGS. 4, 7 and 8. The location of the stop rods and stop-rod holes will be selected in accordance with the type of mold being used in the molding machine. It would be possible to provide more than one set of fluid-pressure jacks 24 and stop rods corresponding to molds of different types if desired.

The elongated molds are conveyed into the molding machine on a roller conveyor having rollers 25, which can be idler rollers or live rollers as may be prefered. The axles 26 of such ollers are journaled in bearing blocks 27 mounted on longiturinal beams 28 of the molding machine frame. Such beams are supported by posts 29 from a mobile base 30. It is preferred that the base be of the mobile type so that the molding machine can be transported easily from one job location to another, but it is not necessary to the functioning of the apparatus for it to be mobile type.

As has been mentioned above, the mold is conveyed into the molding machine on the roller conveyor when the backing plates 12 have been spread to the relationship shown in full lines in FIG. 5 so that the mold end plates 7 can pass between the backing plates. As shown in FIG. 4 the mold end plates 7 are spaced apart a distance just slightly exceeding the lengths of the backing plates 12 and strongback bars 16. When the forward end plate 7 of the mold has passed beyond the backing plates and strongback bars, therefore, such bars and plates can be tilted inward from the full-line positions shown in FIG. 5 to the full-line positions of FIG. 6. The mold will then be in a position relative to the molding apparatus for performance of a molding operation.

To hold the mold in this position, mold end positioning plates 31 may be swung about their supporting pivots 32 from retracted downwardly-swung positions, shown in broken lines at the left of FIG. 1 and in FIG. 4, upward into the full-line positions of FIGS. 1, 4, 7 and 8. Such swinging is effected by actuation of jacks 33 mounted at opposite ends of the molding apparatus on pivots 34 supported by hangers 35 as indicated in FIGS. 2, 3 and 8. Each jack plunger 36 is connected to its mold end positioning plate by a pivot 37. Each holding plate 31 has adjusting screws 38 threaded through it which are engageable with the corresponding mold end plate 7. Adjustment of such screws can be effected to insure that even pressure will be transmitted from the positioning plate to the mold end plate.

When the mold has been positioned in the molding machine and the backing plates 12 have been moved into positions between the end plates 7 as shown in full lines in FIG. 6, the backing plates may be connected respectively to the mold side plates 1 when the backing plates have been moved into contiguous backing contact with such mold plates as indicated in broken lines in FIG. 5. The connection between the backing plates and mold side plates is effected by actuation of latching jacks 39 to project the latch plungers 40 downward to engage in holes 41 provided in lugs 42 welded onto the mold side plates. Thereafter, positioning and movement of the mold side plates can be placed under the control of the backing plates 12 if the side plate-securing rods 43 are withdrawn from the apertures 44 in the end plates 7 shown in FIG. 6, or are at least retracted sufficiently so that the upper side plate flanges 1' will be able to pass the ends of rods 43. Otherwise engagement of the mold side plate upper flanges 1' with the rods 43 will hold such side plates from being spread apart from the position indicated in full lines in FIG. 5 and in broken lines in FIG. 6.

Concrete mix may be supplied to a mlod in the molding machine from an elongated hopper 45 located above the mold and disposed with its length parallel to the length of the mold as shown in FIG. 8. The concrete mix is agitated to a substantially homogeneous consistency by bars of a mixing rotor 46 carried by a shaft 47 which is rotatable in a bearing 48 mounted on the end of the hopper. Such shaft is rotated by a drive motor 49 mounted on the frame 50.

Concrete mix may be supplied to a mold in the molding apertures 51 in its bottom. Such discharge of concrete mix can be controlled by reciprocation of a plate 52 overlying the trough bottom and having in it apertures 53 matching the trough bottom apertures 51 as shown in FIGS. 8 and 9. One end of the control plate 52 projects through a slot 54 in an end of the hopper 45 so that the control plate can be shifted lengthwise. Such movement is effected by an actuating jack 55, the plunger 56 of which is connected to the end of control plate 52 by a yoke 57.

Concrete mix discharged from the hopper 45 passes through apertures 53 and 51 into a measuring chute 58. The volume of such measuring chute can be selected by altering the swing position of closure plate 59 relative to the chute when such plate is in closed position. The closure plate is supported for swinging between open and closed positions by a hinge 60 mounted on the bottom of hopper 45. The extent to which the closure plate 59 must swing to close the measuring chute 58 depends on the radial extent of the closure plate. To enable such radial extent to be varied, an extension strip 61 is mounted on the swinging edge portion of the closure plate. Radial adjustment of such extension strip is afforded by providing radial slots 62 in it through which extend bolts 63 screwed into tapped holes in the closure plate 59.

The closure plate 59 is swung relative to measuring chute 58 between open and closed positions by a fluid-pressure jack 64 supported from the hopper by a mounting bracket 65 to which the jack is connected by a pivot 66. The jack plunger 67 is connected by a pivot 68 to a yoke 69 mounted on the closure plate extension strip 61.

In operation a mold is conveyed by the rollers 25 of the roller conveyor into the molding apparatus between the spaced backing plates while they are spread apart by the jacks 17 to their positions shown in FIG. 5. When the mold has been moved into the molding apparatus to a position in which the backing plates 12 will pass between the mold end plates 7, the jacks 17 are actuated to swing the backing plates from the solid-line position of FIG. 5 into the broken-line position of that figure. Next the latch jacks 39 are actuated to engage the latch pins 40 in the apertures 41 of lugs 42 so that the backing plates and the mold side plates are interconnected for conjoint movement. The mold side-securing rods 43 are then withdrawn to free the mold side plates 1 for movement relative to the mold end plates 7.

With the mold side plates 1 thus freed for tilting relative to the mold end plates 7, the stop rods 23 are projected into the apertures 22 of the presser-mounting plates 15 to limit the extent of outward swinging of the backing plates 12. The jacks 17 may then be actuated to swing the backing plates and mold side plates 1 from the broken-line positions of FIG. 6 to the solid-line positions of that figure. If a core tube 11 has not yet been placed in the mold form, such tube is next inserted and the mold end positioning plates 31 are swung from their retracted positions shown in broken lines in FIG. 4 into their holding positions shown in full lines in FIG. 1 by actuation of jacks 33. The mold is now ready to receive concrete mix from hopper 45.

Assuming that the extension strip 61 has been adjusted to provide the proper volume of the measuring chute 58, jack 55 can be reciprocated to move control plate 52 into a position such that its apertures 53 are in registry with apertures 51 while the closure plate 59 is held in its closed position by jack 64, as shown in FIG. 9. When the measuring chute has been filled with concrete mix the control plate 52 will be reciprocated by jack 55 to move the control plate apertures 53 out of registry with the hopper bottom apertures 51 and thus cut off flow of mix from the hopper to the measuring chute. Jack 64 may now be retracted to swing the closure plate 59 from the solid-line position of FIG. 9 into the broken-line position of that figure so that the measured charge of concrete will be dumped into the mold.

In order to settle the concrete mix in the mold the jacks 17 may be extended and retracted several times to swing the backing plates 12 and mold side plates 1 inward from the solid-line positions shown in FIG. 6 and back outward. On the final stroke the jacks 17 are extended sufficiently so that the backing plates 12 force the mold side plates 1 inward to the broken-line positions shown in FIG. 6. In such positions the side plate-securing rods 43 can be projected through the apertures 44 into the positions shown in FIGS. 4 and 7 so that the upper side wall flanges 1' will bear against such rods and hold the mold side walls against outward swinging.

The latching jacks 39 can next be actuated to retract their plungers 40 from the apertures 41 in the mold sides to disconect the backing plates from the mold side plates 1. Cylinders 24 can then be actuated to withdraw stop rods 23 from their apertures in plates 15, after which jacks 17 can be retracted to swing the backing plates 12 and other portions of the presser mechanism into the solid-line positions shown in FIG. 5. When the jacks 33 have been retracted to swing the mold-end positioning plates 31 from their upright positions into their lowered retracted positions shown in broken lines in FIG. 4, the filled mold can be roled out of the molding machine on the rollers 25 of the roller conveyor and the next mold can be rolled into place in the machine to be filled.

When the filled mold has been removed from the molding machine it can be transported to a curing room where it will remain until the concrete has set. After the concrete has set the mold end plate-securing rods 43 can be withdrawn and the upper flanges 1' of the mold sides can be pressed apart, which will serve the double function of stripping such side plates from the sides of the molded plank and of causing the mold side flanges 2 to raise the bottom of the molded plank to strip it from the liner 6. The molded plank can then be hoisted from the mold to pull its dovetail bottom groove off the flexible liner central bulge 5. Now the mold can be reassembled and the securing rods 43 projected through their apertures 44 again to restore the mold to its assembled condition to be returned to the molding machine.

We claim:

1. The combination of a mold and a molding machine for molding elongated concrete products, the mold comprising a bottom plate having upwardly-flaring edge flanges, end plates at opposite ends of said bottom plate, opposite side plates having lower inwardly and downwardly inclined flanges settable on the flaring flanges of said bottom plate, and means interengageable between the upper portions of said end plates and the upper portions of said side plates for limiting separating movement of the upper portions of said side plates, and said molding machine comprising two power reciprocating means alongside the outer sides of said mold side plates, respectively, and connecting means for connecting each of said power reciprocating means and its corresponding mold side plate for effecting reciprocation of said mold side plates for altering the spacing between them.

2. The combination defined in claim 1, and elongated hopper means above the mold for supplying concrete mix to the mold, and measuring chute means between said hopper means and the mold for holding a charge of concrete mix to be deposited in the mold.

3. The combination defined in claim 2, in which the measuring chute means includes a door adjustable in width for altering the volume of the measuring chute means.

4. In a molding machine for molding an elongated concrete product in a horizontally elongated mold including a bottom plate, end plates at opposite ends of the bottom plate and side plates located between the end plates and relatively movable transversely of their lengths to increase and to decrease the width of the molding space between the mold side plates, fluid-pressure jack means at each side of the mold, each including a backing plate behind the side plate of the mold for effecting reciprocation of the side plate, fluid-pressure pitson-and-cylinder latch means selectively connecting each of said backing plates and its corresponding mold side plate for conjoint movement, disengageable means for interconnecting the side plates and the end plates of the mold to limit relative separating movement of the side plates and thereby limit the width of the molding space between the side plates when said latch means are not connecting said backing plate and the side plate and disengageable to free the side plates from the end plates for reciprocation of the side plates effected by said fluid-pressure jack means when said latch means are conecting said backing plates and the respective mold side plates associated therewith, means supporting a mold for lengthwise movement between said two backing plates, and holding means retractable out of lengthwise registry with the mold for movement of the mold lengthwise therepast out from between said two backing plates when said latch means are disengaged, and said holding means being movable into holding engagement with the mold end plates to prevent inadvertent movement of the mold out from between said backing plates.

5. In a molding machine for molding an elongated concrete product in a horizontally elongated mold including a bottom plate, end plates at opposite ends of the bottom plate and side plates located between the end plates and relatively movable transversely of their lengths to increase and to decrease the width of the molding space between the mold side plates, two power reciprocating means at opposite sides of the mold, respectively, for effecting reciprocation of the side plates, latch means selectively connecting each of said power reciprocating means and its corresponding mold side plate for conjoint movement, stop means for said power reciprocating means disposed in retracted condition when said latch means are not connecting said power reciprocating means and their corresponding mold side plates and movable into the path of movement of said power reciprocating means to limit movement thereof when said latch means are engaged to connect said power reciprocating means and their mold plates, and disengageable means for limiting relative separating movement of the mold side plates when said latch means are not connecting said power reciprocating means and the mold side plates.

6. In a molding machine for molding an elongated concrete product in a horizontally elongated mold including a bottom plate, end plates at opposite ends of the bottom plate and side plates located between the end plates and relatively movable transversely of their lengths to increase and to decrease the width of the molding space between the mold side plates, two power reciprocating means at opposite sides of the mold, respectively, each of said power reciprocating means including a backing plate behind a side plate of the mold for effecting a relative movement of the side plates, latch means selectively connecting each of the backing plates and its corresponding mold side plate for conjoint movement, and disengageable means for interconnecting the side plates and the end plates of the mold to limit relative separating movement of the side plates and thereby limit the width of the molding space between the side plates when said latch means are not connecting said backing plates and the side plates and disengageable to free the side plates from the end plates for spreading movement of the side plates effected by said power reciprocating means when said latch means are connecting said backing plates and the respective mold side plates associated therewith.

7. In a molding machine for molding an elongated concrete product in a horizontally elongated mold including a bottom plate, end plates at opposite ends of the bottom plate and side plates located between the end plates and relatively movable transversely of their lengths to increase and to decrease the width of the molding space between the mold side plates, two power reciprocating means at opposite sides of the mold, respectively, for effecting reciprocation of the side plates, latch means selectively connecting each of said power reciprocating means and its corresponding mold side plate for conjoint movement, and disengageable means for interconnecting the side plates and the end plates of the mold to limit relative separating movement of the side plates and thereby limit the width of the molding space between the side plates when said latch means are not connecting said power reciprocating means and the side plates and disengageable to free the side plates from the end plates for spreading movement of the side plates effected by said power reciprocating means when said latch means are connecting said power reciprocating means and the respective mold side plates associated therewith.

8. In the molding machine defined in claim 7, means supporting a mold for lengthwise movement between the two power reciprocating means, and holding means engageable with the mold to prevent inadvertent lengthwise movement thereof out from between the two power reciprocating means when the power reciprocating means are connected to the mold side plates and retractable out of holding engagement with the mold for movement of the mold lengthwise therepast out from between the two power reciprocating means when the latch means are disengaged.

9. In a molding machine for molding an elongated concrete product in a horizontally elongated mold including a bottom plate, end plates at opposite ends of the bottom plate and side plates located between the end plates and relatively movable transversely of their lengths to increase and to decrease the width of the molding space between the mold side plates, two power reciprocating means at opposite sides of the mold, respectively, for effecting reciprocation of the mold side plates, releasable means connecting each of said power reciprocating means and its corresponding mold side plate for conjoint movement, disengageable means for limiting relative separating movement of the mold side plates when said releasable means are not connecting said power reciprocating means and the mold side plates, means supporting the mold for lengthwise movement between said two power reciprocating means when the releasable means is released to sever the connection between said power reciprocating means and the corresponding mold side plates, and holding means engageable with the mold to prevent inadvertent movement thereof out from between said two power reciprocating means when said power reciprocating means are connected to the mold side plates and retractable out of holding engagement with the mold for movement of the mold lengthwise therepast out from between said two power reciprocating means when said releasable means have been released.

References Cited
UNITED STATES PATENTS

| | | | |
|---|---|---|---|
| 2,582,161 | 1/1952 | Randall | 25—41 R |
| 3,132,403 | 5/1964 | Richards et al. | 249—170 X |
| 3,479,704 | 11/1969 | Reed | 249—50 |
| 3,491,680 | 1/1970 | Smith | 25—41 D |
| 3,537,157 | 11/1970 | Locke | 25—103 |

J. SPENCER OVERHOLSER, Primary Examiner

D. W. JONES, Assistant Examiner

U.S. Cl. X.R.

249—50, 155, 162; 425—62, 256, 89, 200, 414